July 12, 1960 R. S. ELLIOTT 2,945,230
SURFACE WAVE STRUCTURE
Filed Oct. 31, 1956
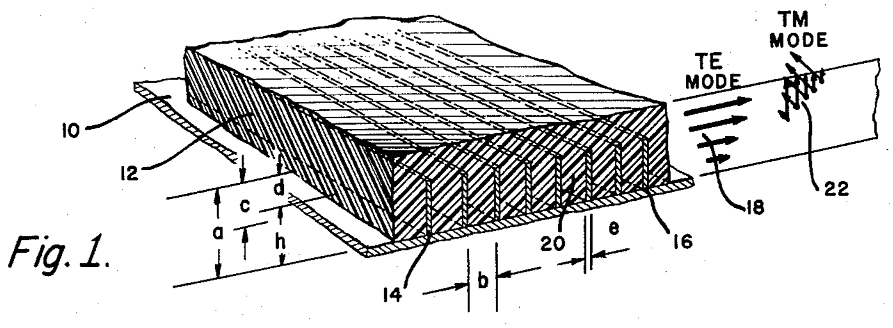
Fig. 1.
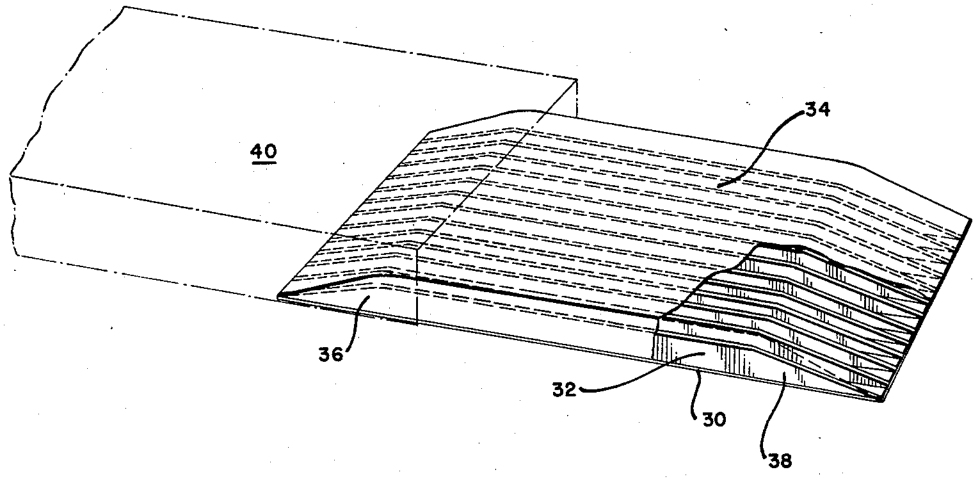
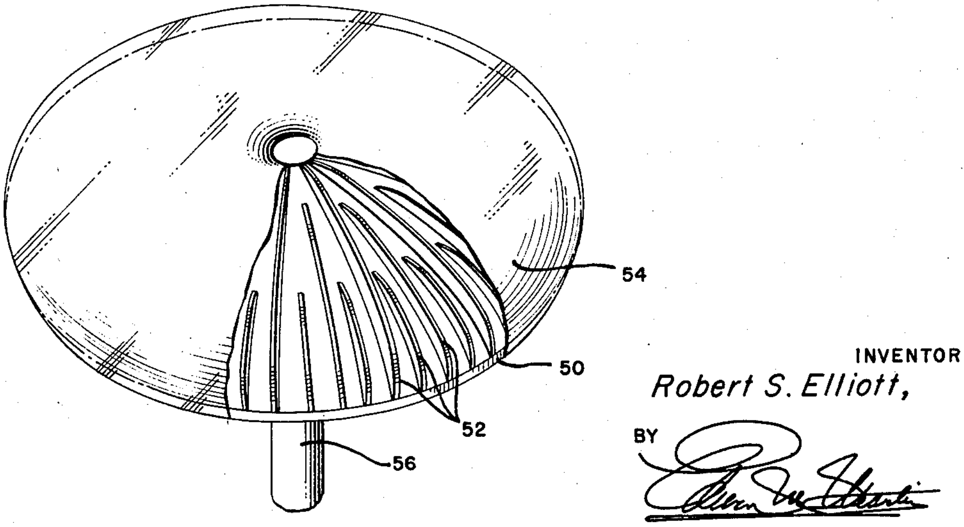
Fig. 3. Fig. 2.
INVENTOR
*Robert S. Elliott,*
BY
ATTORNEY United States Patent Office 2,945,230

Patented July 12, 1960

2,945,230

SURFACE WAVE STRUCTURE

Robert S. Elliott, Los Angeles, Calif., assignor to Hughes Aircraft Company, Culver City, Calif., a corporation of Delaware Filed Oct. 31, 1956, Ser. No. 619,516

7 Claims. (Cl. 343—772)

This invention relates to surface wave structures, and more particularly to a trapping structure adapted to propagate arbitrarily polarized wave energy.

As is well known to those skilled in the art, electromagnetic wave energy may be propagated over a metallic ground plane as a trapped surface wave when the ground plane is provided with a suitable trapping structure. One trapping structure now used very extensively comprises a plurality of corrugations or channels cut into the ground plane whose direction of elongation is transverse to the direction of propagation of the trapped surface wave. Corrugated metallic surfaces are capable of supporting a surface wave in the TM-mode only and thereby impose a limitation on the utility of this trapping structure. TM-mode for the purpose of this application is defined as plane polarized wave energy whose plane of polarization is determined by the electric field vector and is perpendicular to the surface defined by the ground plane.

Another trapping structure which has found widespread application in the transmission of trapped surface waves comprises a dielectric slab bonded to the metallic ground plane. Such a dielectrically clad surface is adapted to support and to propagate a surface wave in both the TM-mode and the TE-mode and thereby provides a transmission medium having greater utility than that of a corrugated surface. A TE-mode for the purpose of this application is defined as plane polarized wave energy whose plane of polarization as determined by the electric field vector and is parallel to the surface of the ground plane. The greater versatility of the dielectrically clad surface in being able to support and propagate surface waves in the TM-mode and TE-modes, however, is limited by the fact that these modes are propagated over the ground plane with different velocities. Consequently, surface wave propagation over a di-electrically clad surface is limited to two independent orthogonally plane polarized waves.

In surface wave transmission systems it is often desirable to propagate elliptically polarized wave energy. The requirements for such a system is that the trapping agent supports and propagates plane polarized wave energy regardless of the orientation of the plane of polarization with the same velocity. One trapping structure suitable to transmit elliptically polarized wave energy which is being used for this purpose comprises multiple slab dielectric surfaces in which two or more dielectric slabs having different transmission characteristics are bonded to one another. Such multiple dielectric slab surface wave structures are described in "Trapped Wave Antennas" by Ehrenspeck, Gerbes and Zucker, Convention Record of the IRE, 1954 National Convention, published by the Institute of Radio Engineers, page 25, vol. 2, part 1.

It is an object of this invention to provide a single slab surface wave structure adapted to support and to propagate both the TE-mode and the TM-mode of a surface wave with the same velocity.

It is a further object of this invention to provide a trapping structure which after bonding to a ground plane provides a surface wave structure adapted to support and to propagate an arbitrarily polarized surface wave.

It is a further object of this invention to provide a surface wave structure adapted to propagate arbitrarily polarized surface waves, which structure is of simplified construction and possesses increased mechanical ruggedness.

A single slab arbitrary polarization surface wave structure of this invention includes a trapping structure bonded to a ground plane which effectively offers a different dielectric thickness to the TE-mode and TM-mode. The trapping structure comprises a single dielectric slab and metallic vanes imbedded therein for the purpose of presenting a different effective thickness to the two modes of the surface wave. The TE-mode, which has its electric vector parallel to the surface defined by the ground plane and perpendicular to the direction of propagation of the wave, is the faster of the two orthogonal modes and is affected by the entire physical thickness of the dielectric slab to decrease its velocity of propagation. The TM-mode, which has one electric vector component perpendicular to the surface defined by the ground plane, and another component parallel to the direction of propagation of the wave, is the slower of the two orthogonal modes and is confined to only a portion of the physical thickness of the dielectric slab to increase its relative velocity. The depth of the portion to which the TM-mode is confined is selected such that the velocity of propagation of the TE-mode becomes equal to that of the TM-mode.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressly understood, however, that the drawing is for the purpose of illustration and description only, and is not intended as a definition of the limits of the invention.

Fig. 1 is a perspective fragmentary view of a single slab arbitrary polarization surface wave structure in accordance with this invention;

Fig. 2 is a perspective view of an embodiment of a surface wave antenna employing the trapping structure of Fig. 1; and Fig. 3 is a perspective view of an embodiment of an omni-directional surface wave beacon antenna employing the trapping structure of Fig. 1.

Referring now to the drawing and particularly to Fig. 1, there is shown a metallic plate 10 forming a ground plane to which is bonded a single slab 12 of a dielectric material such as polystyrene having uniform thickness, *a*. A plurality of thin elongated metallic septa 14 having a height, *h*, and a width, *e*, rests on the ground plane 10 with their respective end faces 16. It will be noted that the height of septa 14 is less than the thickness, *a*, of the slab 12. Accordingly, except for the end faces 16, the septa 14 are completely embedded in the dielectric slab 12. As a practical matter, the septa 14 may be affixed to the ground plane 10 by providing location grooves in the ground plane 10 and soldering the septa 14 into the grooves. The dielectric slab 12 may be prepared with U-channels to accommodate the septa 14 and bonded to the ground plane 10 and the septa 14.

The ground plane 10, the dielectric slab 12 and septa 14 provide a surface wave structure which is adapted to transmit arbitrarily polarized wave energy in the direction of elongation of the septa 14. The septa 14 and the slab 12 together form the trapping agent. As is well known in the art, the velocity of propagation of wave energy within a given dielectric medium is determined among other factors by the thickness of the dielectric medium. Also, surface waves, which are electromagnetic waves trapped upon a surface by a trapping structure, such as the one shown in Fig. 1, may be confined to the dielectric slab of the trapping structure and propagated in the TE-mode and the TM-mode. For a given thickness of a dielectric transmission medium, the TE-mode has a greater velocity than the TM-mode. Consequently, in order to achieve equal velocities of propagation for the TE-mode and the TM-mode, it will be necessary to provide a propagation path within the trapping structure which has a different effective thickness for each of the two modes to be propagated.

It is also well known in the art that surface waves propagated in the TE-mode by the dielectric slab 12 bonded to the ground plane 10 will assume an electric field distribution as shown by the set of electric field vectors 18 which represent the amplitude distribution of the electric field in the direction away from the ground plane 10 and within the slab 12. The amplitude of the electric field in the neighborhood of the ground plane 10 must approach zero because of well-known boundary conditions. The electric field has its maximum amplitude at a position farthest away from the ground plane 10, but still within the dielectric slab 12.

It is also well known in the art that the interposition of thin metallic vanes such as the septa 14 will not disturb the TE-mode of the surface wave to any appreciable extent as long as the thickness, *e*, of the septa 14 is very much smaller than the spacing, *b*, which is the distance between adjacent vanes. Consequently, the velocity of the TE-mode in a direction parallel to the septa 14 will be a function of the thickness, *a*, of the dielectric slab 12. Increasing the thickness, *a*, reduces the velocity of propagation of the TE-mode.

If the spacing, *b*, between adjacent septa 14 is made smaller than one-half of the working wavelength of the surface wave transmitted, then the TM-mode propagated by the dielectric slab cannot penetrate into the region 20. The region 20 is defined as the space lying below the top edges of and between the septa 14. The reason that the TM-mode cannot propagate into region 20 is that the electric field component of the TM-mode in the direction of propagation must vanish at the sides of the septa by well-known boundary conditions. In other words, the TM-mode is confined to a wave propagation path of depth, $d=a-h$. The electric field distribution of the TM-mode is illustrated by the electric field vector component diagram 22 in which the length of each vector component represents the amplitude of the field component existing at the position denoted by the foot of the vectors. The electric field vector component in the direction of propagation is smallest in the proximity of the region 20 and increases as the dielectric-air boundary is approached. Just the opposite is true of the transverse field component, as illustrated.

To a first approximation the TE-mode and the TM-mode may be propagated with the same velocity by the surface wave structure of Fig. 1 by selecting proper values for the dielectric slab thickness, *a*, which determines the path thickness of the medium for the TE-mode, and the septa height, *h*, which provides the path thickness, *d*, for the TM-mode. The path thickness of the dielectric medium is the thickness which is available to the different modes of the surface wave. In practice, however, it is found that the simple analysis presented here is only an approximation. The assumption that the TM-mode does not penetrate at all into the space 20 is not borne out by experiment.

It has been found analytically, and verified experimentally, that a certain amount of penetration of the TM-mode into the space 20 takes place. The result of this investigation shows that the average path thickness for the TM-mode is not the quantity, *d*, but instead is *c*, which quantity is defined as $$c=a-h+\frac{b\ln 2}{\pi}=a-h+0.225b$$

where *ln* is the logarithm to the natural base. Therefore, the selection of the proper path thickness, *c*, to increase the velocity of the TM-mode involves not only the height of the septa, *h*, but also the septa spacing, *b*, and the slab thickness, *a*. Further analysis of the problem has shown that for a given dielectric, the quantities *a* and *c*, to provide respectively the same velocity of propagation to the TM and TE-modes, must be determined from transcendental functions and no simple algebraic expression will provide even an approximate solution.

The surface wave structure of this invention is adapted to transmit elliptically polarized surface waves and may be employed in all applications which have heretofore been performed by corrugated or dielectrically clad surfaces.

By way of example, a surface wave antenna is shown in Fig. 2 which incorporates the trapping structure of Fig. 1. A metallic sheet 30 forming a ground plane is provided with a plurality of longitudinal thin planar septa 32 which are in contact with the metallic ground plane 30. A dielectric slab 34 completely imbedding the septa is bonded to the metallic ground plane 30. The edges of the septa as well as the dielectric slab are tapered at both ends 36 and 38. A wave energy radiator 40 acting as a wave energy feed for elliptically polarized wave energy launches a surface wave along the surface wave antenna by way of the tapered portion 36. The height of the dieletric slab 34 and the height of the septa 32 are adjusted in conformity with the principles set down in conjunction with Fig. 1 so that the TM-mode and the TE-mode of the surface wave are propagated over the ground plane 30 with the same velocity. At the end of the antenna the discontinuity occasioned by the tapered end section 38 provides a suitable obstacle for radiating the surface wave into space.

Fig. 3 illustrates another application of the trapping structure described in Fig. 1 as an omnidirectional beacon antenna. A ground plane is provided by a metallic plate 50 forming a parabolic surface of revolution whose shape determines the direction of the resulting omnidirectional beam. The ground plane 50 has affixed to it a large number of radial vanes 52 over which a dielectric body 54 of uniform thickness is placed and bonded to surface of revolution 50. The thickness of the dielectric slab 54 and the height of the radial vanes 52 are adjusted in conformity with the above discussion so that the velocity of propagation of the TE-mode and the TM-mode are identical. As may be seen from Fig. 3, the radial vanes diverge from one another and therefore may violate the condition that the distance between adjacent vanes perpendicular to the direction of propagation of wave energy must be less than one-half of the working wavelength of the surface wave. However, this problem is easily solved by providing additional vanes and interposing these additional vanes wherever necessary, as shown in Fig. 3. The dielectric body is tapered toward the center opening and the outer rim of the body both to provide smooth discontinuities for launching and radiating the surface wave. Wave energy feed means, such as a cylindrical waveguide 56 adapted to provide cross-polarized wave energy, may be axially coupled to the surface of revolution 50 which surface is provided with a matching central aperture to effect an interchange of the wave energy between the antenna and the cylindrical feed waveguide.

What is claimed is:

1. A surface wave structure adapted to support and to propagate a surface wave having a TM-mode and a TE-mode component comprising: a metallic member defining a ground plane; a slab of dielectric material of predetermined thickness bonded to said member and adapted to provide a propagation path for said TE-mode component, the velocity of propagation of said TE-mode component being established by said predetermined thickness; and a plurality of thin elongated metallic septa of predetermined height, said height being less than said thickness, said septa being imbedded in said slab defining a septa region, the dielectric material above said septa region defining a propagation path adapted to propagate said TM-mode component, said septa being separated from one another a distance of less than one-half of the working wavelength of said surface wave to prevent substantially the penetration of said TE-mode component into said septa region, the velocity of propagation of said TM-mode being established by the difference between said thickness and said height.

2. A surface wave structure adapted to support and to propagate a surface wave having a TM-mode and a TE-mode component comprising: a metallic member defining a ground plane; a slab of dielectric material of predetermined thickness bonded to said member and adapted to provide a propagation medium for said TE-mode component, the velocity of propagation of said TE-mode being established by said predetermined thickness; and a plurality of thin elongated metallic septa of predetermined height, said height being less than said thickness, said septa being imbedded in said slab and coupled to said member and separated from one another a distance of less than one-half of the working wavelength of said TM-mode component, the dielectric material of said slab lying above said septa defining a propagation path adapted to propagate said TM-mode component with a velocity established by the difference between said predetermined thickness and said predetermined height, said predetermined height being selected such that the velocity of propagation of said TE-mode component and said TM-mode component is substantially equal.

3. A surface wave structure adapted to support and to propagate a surface wave having a TM-mode and a TE-mode component comprising: a metallic member defining a ground plane; a slab of dielectric material of thickness, $a$, bonded to said member and adapted to provide a first propagation path to said TE-mode component, the velocity of propagation of said TE-mode being established by said thickness, $a$; and a plurality of thin elongated metallic septa of height, $h$, where $h$ is less than $a$, said septa being imbedded in said slab and coupled along their length to said member, the distance between adjacent septa, $b$, being less than one-half of the working wavelength of said TM-mode, the dielectric material of said slab extending above said septa providing a second propagation path existing principally in the dielectric material above said septa and being of thickness, $c$, where $c$ is defined by the algebraic expression, $$c=a-h+\frac{b\ln 2}{\pi}$$

and where $h$ and $b$ are selected such that the first and the second propagation paths propagate respective TE-mode and TM-mode components with substantially the same velocity.

4. A surface wave structure adapted to support and to propagate a surface wave of arbitrary polarization comprising: a metallic member defining a ground plane; a plurality of thin elongated metallic septa of predetermined height longitudinally coupled to and extending perpendicular from said member, the distance separating any two adjacent septa being less than one-half of the working wavelength of said surface wave; and a slab of dielectric material having a predetermined thickness larger than the height of said septa and including a plurality of thin elongated U-channels bonded to said member, said channels permitting imbedding of said septa completely within said slab.

5. A surface wave structure adapted to support and to propagate a surface wave having a TM-mode and a TE-mode component and comprising: a metallic member defining a ground plane; a plurality of thin elongated parallel metallic septa of predetermined height longitudinally coupled to and extending perpendicular from said member, the distance separating any two adjacent septa being less than one-half of the working wavelength of said TM-mode component; and a slab of dielectric material having a predetermined thickness greater than said height and including a plurality of thin elongated U-channels bonded to said member, said channels permitting imbedding of said septa completely within said slab, said thickness and said height being selected such that said TM-mode component and said TE-mode component of said surface wave are propagated over said surface wave structure with substantially the same velocity.

6. A surface wave antenna comprising: an electromagnetic radiator adapted to provide arbitrarily polarized wave energy; a metallic member defining a ground plane coupled to said electromagnetic radiator; a slab of dielectric material of predetermined thickness bonded to said member; and a plurality of thin elongated metallic septa of a predetermined height, said septa being imbedded in said slab and coupled along their length to said member such that the direction of elongation of said septa is parallel to the direction of propagation of said wave energy, said septa being located in parallel relationship and laterally displaced from one another a distance of less than one-half of the working wavelength of said wave energy, said predetermined height and said predetermined thickness being selected such that the orthogonal components of said arbitrarily polarized wave energy have the same velocity of propagation over said surface wave antenna.

7. In a surface wave beacon antenna including a member having the shape of a surface of revolution and defining a ground plane, said member having a feed opening in its center adapted to couple feed means thereto to provide cross-polarized wave energy to said ground plane, a trapping structure juxtaposed with said member and adapted to trap and convert said wave energy into a TM-mode and TE-mode component of a surface wave and propagate said modes with substantially equal velocities over said member, said trapping structure comprising: a slab of dielectric material of predetermined thickness adapted to provide a propagation medium for said TE-mode surface wave component, the velocity of propagation for said TE-mode component being established by said predetermined thickness; a plurality of thin elongated metallic vanes of predetermined height, said height being less than said predetermined thickness, said vanes extending radially and being imbedded in said slab, the dielectric material of said slab lying above said vanes defining a propagation medium adapted to propagate said TM-mode surface wave component with a velocity established by the depth of said medium, the length of any cord of the sector formed by said vanes not exceeding one-half of the working wavelength of said TM-mode component, said depth being selected such that the velocity of propagation of said TE-mode component and said TM-mode component are substantially equal.

References Cited in the file of this patent

UNITED STATES PATENTS

| | | |
|---|---|---|
| 1,843,622 | Norton | Feb. 2, 1932 |
| 2,654,060 | Stovall et al. | Sept. 29, 1953 |
| 2,659,817 | Cutler | Nov. 17, 1953 |
| 2,688,732 | Kock | Sept. 7, 1954 |